United States Patent [19]

Day, Jr. et al.

[11] Patent Number: 4,782,478
[45] Date of Patent: Nov. 1, 1988

[54] TIME DIVISION CIRCUIT SWITCH

[75] Inventors: Chester Day, Jr., Randolph; James N. Giacopelli, Flanders, both of N.J.; Nian-Chyi Huang, Boca Raton, Fla.; Liang T. Wu, Gladstone, N.J.

[73] Assignee: Bell Communications Research, Inc., Livingston, N.J.

[21] Appl. No.: 21,664

[22] Filed: Mar. 4, 1987

[51] Int. Cl.[4] .......................... H04Q 11/04; H04J 3/24
[52] U.S. Cl. ....................................................... 370/60
[58] Field of Search ...................... 370/60, 94, 85, 68, 370/68.1; 340/825, 79, 825.8

[56] References Cited

U.S. PATENT DOCUMENTS

| | | | |
|---|---|---|---|
| 3,988,545 | 10/1976 | Kuemmerle et al. | 370/60 |
| 4,081,612 | 3/1978 | Hafner | 370/60 |
| 4,168,400 | 9/1979 | de Couasnan et al. | 370/94 |
| 4,516,238 | 5/1985 | Huang et al. | 370/60 |
| 4,603,416 | 7/1986 | Servel et al. | 370/60 |
| 4,661,952 | 4/1987 | von Sichart et al. | 370/94 |
| 4,692,917 | 9/1987 | Fujioka | 370/60 |
| 4,701,906 | 10/1987 | Ransom et al. | 370/60 |
| 4,706,240 | 11/1987 | Payne, III | 370/60 |

OTHER PUBLICATIONS

"Starlite: A Wideband Digital Switch", Huang et al., IEEE, 1984.
"Synchronous Wideband Network—An Interoffice Facility Hubbing Network," L. T. Wu and N. C. Huang, 1986 International Zurich Seminar on Digital Communications, Mar. 11-13, 1986, Switzerland, IEEE Cat. No. 86CH2277-2.

Primary Examiner—A. D. Pellinen
Assistant Examiner—Geoffrey S. Evans
Attorney, Agent, or Firm—James W. Falk

[57] ABSTRACT

A time-division circuit switch which serves as a cross connect for time multiplexed signals including frames subdivided into slots serves to cross-connect input and output lines on a slot-by-slot basis. The circuit utilizes a self-routing packet switching network. An input interface attached to each input line converts incoming slots into fixed length packets which can be routed through the self-routing switching network in a synchronous manner. An output interface coupled to each output line reconverts the packets into slot/frame format. To prevent blocking, the self-routing packet switching network runs at a faster rate than the input and output lines of the switch.

4 Claims, 6 Drawing Sheets

INPUT SIGNAL FORMAT

PACKET FORMAT

TIME DIVISION CIRCUIT SWITCH

FIELD OF THE INVENTION

The present invention relates to an architecture for a time division circuit switch utilizing a self-routing packet switching network. In particular, the switch serves as a cross-connect for signals comprising frames organized into slots.

BACKGROUND OF THE INVENTION

Typically, a switch has two parts; a switching network or switching fabric and a control. The switching network interconnects a set of input lines with a set of output lines. More particularly, the switching network serves to provide a plurality of simultaneous message paths or circuit connections. Each message path or circuit connection connects a particular input line with a particular output line. The control serves to set-up and tear down particular message paths.

When an individual circuit connection or message path is dedicated for the duration of a message, circuit switching is said to take place. However, when the message can be represented by a bursty data stream, a technique called packet switching may be employed. In this case, the incoming data is formed into packets of a defined length. An individual circuit connection or message path within the switching network lasts only for the duration of each packet. Thus, each packet belonging to a particular message follows an associated "virtual circuit". As will be seen below, the distinction between circuit switching and packet switching may be blurred in particular systems.

In general, circuit switching may be classified in accordance with the manner by which data passes through the switching network contained in the circuit switch. In space division switches the message paths in the switching network are separated in space. In time division switches the message paths in the switching network are separated in time, (i.e., time multiplexing is used). Some circuit switches are characterized by both space division and time division.

Most space division switches currently in use in telephone systems comprise one or more stages of coordinate switching networks. A coordinate switching network is a matrix array of cross points, metallic contacts, or electronic devices, etc. by which several inputs can be separately and simultaneously connected to several outputs. The number of cross points required in a coordinate switching network increases quadratically with an increase in the number of input lines or an increase in the number of output lines.

To reduce the number of crosspoints per simultaneous message path, space division switches are constructed with several stages of coordinate switching network and connecting links between stages. If a message path cannot be established because suitable connecting links or outputs are not available, "blocking" is said to occur. Specifically, given an idle input and an idle output but no available internal connecting link, the condition is defined to be "matching loss". Multistage networks are designed to provide an acceptably low probability of matching loss. If the probability of matching loss is zero, the network is said to be non-blocking.

In a time division switch, the switching network is time multiplexed. The input signal stream received on each input line includes signals from multiple messages in a time multiplexed format, a representation typically digital, of each message appearing in a periodically recurring interval of time called a time-slot. In other words, the input signal stream at each input comprises frames which are subdivided into slots. The switching network in a time division switch is generally synchronous. Slots are simultaneously transmitted through the switching network from particular inputs to particular outputs. The message paths or circuit connections in the switching network are reconfigured for each time slot period so that data arriving at the same input in successive time slots may be routed to different outputs.

Each input line to the switching network in the time division switch may include an associated input time-slot interchanger. Similarly, each output line from the switching network in the time division switch also includes an associated output time-slot interchanger. Arriving time-slots in a particular frame are written into an input time-slot interchanger in the sequence of their arrival and read out of the time-slot interchanger for transmission through the switching network in a different sequence. The time-slot interchangers are needed to avoid blocking problems, when time-slots simultaneously arrive at two inputs destined for the same output. In this case, the time-slot interchanger associated with one of the inputs rearranges the order of its time-slots.

Examples of time division circuit switches which include one or more stages of coordinate switching networks are the No. 4ESS and the No. 5ESS of AT&T. In the 4ESS and 5ESS the settings of the cross points in the switching networks are reconfigured at a rate of millions of times per second. The settings of these cross points are usually determined by the content of one or more control RAMS, which in turn are written by a central controller.

One alternative to a matrix type switching network, in which the settings of the cross points are controlled by RAMs, is a self-routing switching network. In a self-routing switching network, routing control is accomplished by attaching a header in front of each information block or data packet to be routed through the network. The header contains the address of the outgoing line to which the information block is to be routed. The address enables the switching nodes in the self-routing switching network to make their own routing decisions. In other words, each header serves to establish a connection between an input and a desired output. These connections may be dynamically reconfigured by changing the headers. An example of a self-routing switching network is the well known Batcher-Banyan network which comprises a Batcher sorting network followed by a Banyan routing network.

Self-routing switching networks have been used to provide communications among processors and memory modules in a computer network, and such self-routing switching networks have also been used in a packet switch. (See for example Huang, et al. U.S. Pat. No. 4,516,238, and Huang et al. Starlite: *A Wideband Digital Switch*, Copyright 1984 IEEE).

An object of the present invention is to provide a time division circuit switch which is based on a self-routing switching network. More particularly, it is an object of the present invention to provide a circuit switch utilizing a self-routing switching network, which switch serves as a cross connect for DS3 signals and other signals comprising frames organized into slots.

SUMMARY OF THE INVENTION

The present invention is a time division circuit switch including a self-routing packet switching network. The self-routing packet switching network serves to interconnect a plurality of input lines with a plurality of output lines. Each input line has an input interface including an input time-slot interchanger and each output line has an output interface including an output time-slot interchanger.

Each input line of the switch receives an input signal stream comprising frames that are subdivided into slots. Different slots in the same incoming frame may be routed to different output lines and their associated output switch interfaces. Typically, the connection pattern is repeated from frame to frame unless a request to set up a new connection or tear down an existing connection is received.

Each input interface has a memory for storing the output destination addresses of incoming slots. In the input interfaces, incoming slots are converted to packet form for routing through the self-routing switching network. Conversion to packet form is achieved by attaching a header in front of the slot, which header includes the stored output destination address of the particular slot. In the output interfaces, packets transmitted through the self-routing packet switching network are reconverted into slots by stripping off the packet headers. Thus, the signals leaving the switch on the output lines comprise frames subdivided into slots. Illustratively, the self-routing switching network is a Batcher-Banyan network of the type described above.

Typically, each input interface of the switch receives j time-slots per frame period and each output interface transmits j time-slots per frame period outward from the switch. In order to prevent blocking, the switching network operates at an internal rate of k packet time-slots per frame period where $k \geq 2j-1$ Thus, the self-routing switching network runs at a faster rate than the input and output lines of the switch.

DETAILED DESCRIPTION

Figure 1:
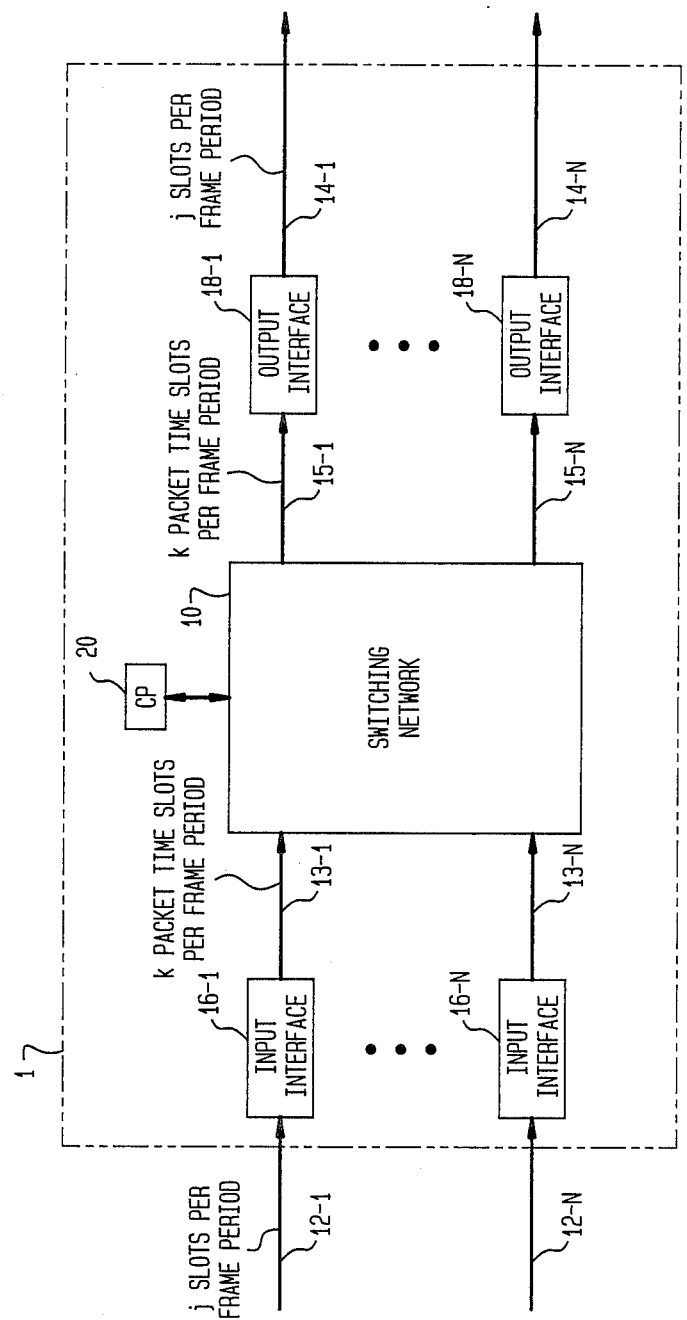
FIG. 1 is a high level diagram of a circuit switch including a self-routing packet switching network, in accordance with an illustrative embodiment of the invention.

FIG. 1 is a high level diagram of a switch 1 in accordance with an illustrative embodiment of the present invention. The switch 1 of FIG. 1 comprises a self-routing packet switching network 10. The switch of FIG. 1 also has a plurality of input lines 12-1 ... 12-N and a plurality of output lines 14-1 ... 14 N. Each input line 12-1 ... 12-N has an input interface 16-1 ... 16.N associated therewith. Similarly, ech output line 14-1 ... 14-N has an output interface 18-1 ... 18-N associated therewith. The switch of FIG. 1 also includes a central control processor 20.

Figure 2:
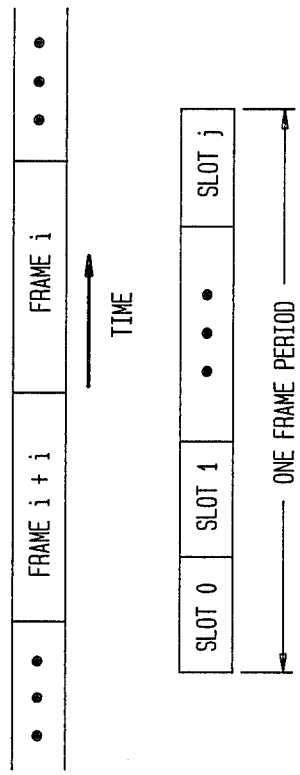
FIG. 2 schematically illustrates the format of input signals to the switch of FIG. 1, which input signals comprise frames divided into slots.

The format of the input signals arriving at switch 1 of FIG. 1 via the lines 12-1 ... 12-N is illustrated in FIG. 2. Each input interface 16-1 ... 16-N receives a signal which is organized into successive frames i,i+1, ... Each frame is divided into j slots. The switching network 10 services to cross connect the input lines 12-1 ... 12-N to the output lines 14-1 ... 14-N on a slot by slot basis, with different slots arriving on the same input line, being routed to different output lines. In general, the connection patterns are the same from frame to frame unless the switch sets up or tears down a connection. The output signals leaving the switch 1 of FIG. 1 via the output lines 14-1 ... 14-N also comprise frames subdivided into slots as shown in FIG. 2.

As discussed above, the input signals to the input interfaces are in frame/slot format. On the other hand, the switching network 10 is a self-routing packet switching network which routes a packet to a particular output depending on an address in the packet header. Thus, the input interfaces 16-1 ... 16-N convert the input time-slots into packets for routing through the switching network 10. These packets leave the input interfaces 16-1 ... 16-N and enter the self-routing switching network 10 via lines 13-1 ... 13-N. Similarly, the packets leave the self-routing switching network 10 and enter the output interfaces via the lines 15-1 ... 15-N. The output interfaces reconvert the packets into slots organized into frames for transmission out of the switch 1 on lines 14-1 ... 14-N.

Figure 3:
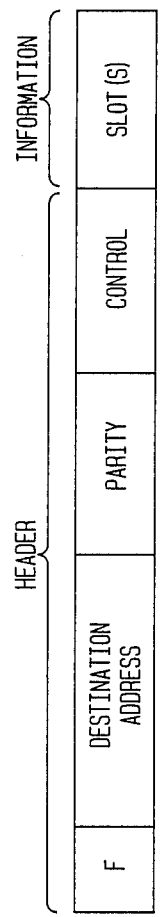
FIG. 3 schematically illustrates the converting of the slots of FIG. 2 into packet format.

The packet switch is shown in FIG. 3. Each packet has a header field and an information field. The header field starts with a flag (F) followed by the destination address of the packet. The header may also contain some parity bits (to enable the output interfaces to do error detection and/or error correction) as well as control bits. The information field typically contains the data of one incoming slot. In an alternative embodiment of the invention, the information field may contain the data of a few slots, e.g., a corresponding slot from each of several consecutive frames - to reduce the overhead resulting from the attachment of packet headers.

As indicated above, the self-routing packet switching network 10 may illustratively be implemented using the known combination of the Batcher sorting and Banyan routing networks. The Banyan network is a self-routing network that can route packets from any input line to the appropriate destination output line, but may result in internal packet contention. One way to resolve such internal packet contention is to use the Batcher sorting network as preprocessor for the Banyan network.

Tyically, there is packet synchronization in the switching network 10. Thus, there is a fixed number of packet time-slots per second (i.e., a fixed number of packet slots per frame period) in the internal links of the switching network. Each packet (i.e., each slot converted to packet form) must be transmitted through the network 10 in one of these internal packet time-slots.

The input interfaces 16-1 ... 16-N are now considered in greater detail. An important function of the input interfaces is the time-slot interchange function. Consider, for example, the need to route the third time-slot in each frame received by input interface 16-N on input line 12-N to output line 14-1 and associated output interface 18-1. This problem is more complex than it initially seems because the third packet received in each frame period by the output interface 18-1 from the switching network 10 may be participating in another connection. Thus, in order to establish a connection between input interface 16-N and output interface 18-1 it is necessary to find a common idle internal packet time-slot on lines 13-N and 15-1 and in the switching network 10. The input interface 16-N must then interchange the order of its incoming slots so that the third incoming slot in each frame is transmitted out of the switch interface 16-N and through the self-routing switching network 10 in the common idle internal packet time-slot.

Blocking occurs if no common idle packet time-slot is found. One approach to reducing the blocking probability is to increase the number of packet time-slots per frame period on the internal links of the switching network 10 and on the lines 13-1 ... 13-N and 15-1 ... 15-N. Thus, as shown in FIG. 1, there maybe j external time-slots per frame period coming into the input interfaces and k (k>j) internal packet time-slots per frame period leaving the input interfaces and propagating through the switching network 10. Similarly, there are k internal packet time-slots leaving the switching network 10 and entering the output interfaces per frame period and there are j external time-slots leaving the output interfaces per frame period. This approach will require an increase in the internal speed of the switching network 10, relative to the speed of the signals arriving at the input interfaces and leaving the output interfaces.

Figure 4:
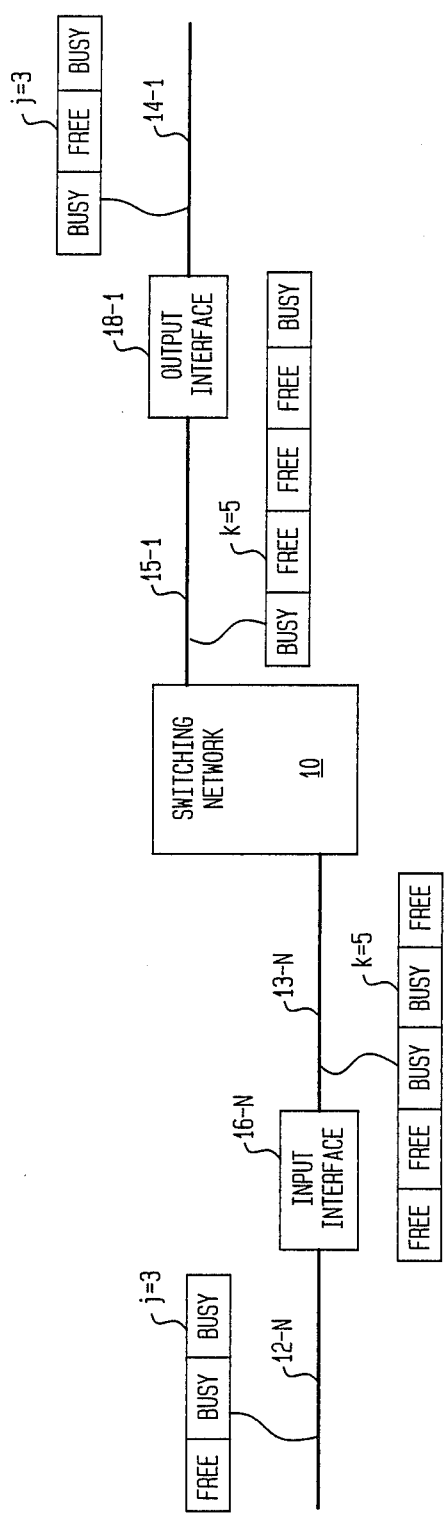
FIG. 4 schematically illustates the speeding up of a self-routing packet switching network to prevent blocking.

The relationship between k and j may be understood through the aid of FIG. 4. In FIG. 4, j=3. This means that three external time-slots per frame period enter the input interface 16-N on input line 12-N and three external time-slots per frame period leave the output interface 18-1 on output line 14-1. Initially, the third external time-slot in each frame entering input interface 16-N is free. In contrast, the second external time-slot in each frame leaving the output interface 18-1 is free while the first and third external time-slots are busy.

Since both input interface 16-N and output interface 18-1 have an idle external time-slot, it is possible to establish a connection between them. However, there is no common idle time-slot. To provide the needed common time-slot, the switching network 10 is run at a faster rate than j=3 slots per frame period. Thus, the switching network 10 has k packet time-slots per frame period where k is larger than j. If k≧2j-1 k is larger than or equal to five in the present example), there will always be a common idle internal packet time-slot between a particular input interface and a particular output interface, as long as each incoming frame to the input interface has a free slot and each outgoing frame from the output interface has a free slot.

Thus, for example, in FIG. 4, there are five packet time-slots leaving the input interface 16-N on line 13-N. Slots 2 and 3 are busy and slots 1, 4, and 5 are free. Similarly, there are five packet slots entering the output interface 18-1 on line 15-1. Slots 1 and 5 are busy and slots 2, 3, and 4 are free. Slot 4 is a common idle time-slot and can be used to provide a connection between input interface 16-N and output interface 18-1. Illustratively, the switch architecture of FIG. 1 may be used as a cross connect for SYNTRAN DS3 signals. During a frame period of 125 microseconds, the SYNTRAN DS3 signals comprise 28 DS1 slots, each DS1 slot comprising 193 bits. These SYNTRAN DS3 signals, enter the input interfaces and leave the output interfaces in FIG. 1. In this case, the function of the switch of FIG. 1 is to serve as a cross connect on a DS1 slot by DS1 slot basis. In other words, data in any DS1 slot in any incoming DS3 signal should be routable to an idle DS1 slot in any outgoing DS3 signal. When the input and output signals are SYNTRAN DS3 signals, there are at least 55 internal packet time-slots per 125 microsecond frame period (i.e., k=2(28)−1=55) wherein each packet slot including the packet header now comprises 224 bits.

Figure 5:
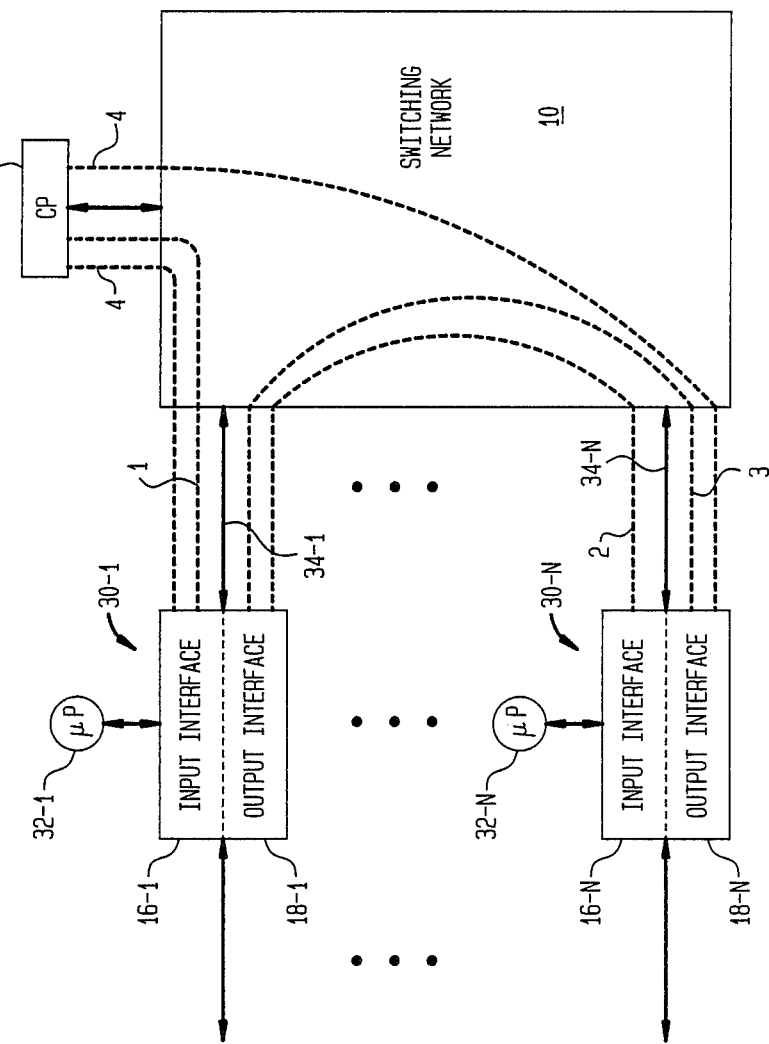
FIG. 5 schematically illustrates how a connection is set up using the switch of FIG. 1.

FIG. 5 illustrates how a particular connection is set up. FIG. 5 is an alternate representation of the switch of FIG. 1. The switch of FIG. 5 shows the same self-routing switching network 10 and control processor 20 as are shown in FIG. 1. However, instead of showing separate input and output interfaces, switch interfaces 30-1 ... 30-N are shown. Typically, each of the switch interfaces 30-1 ... 30-N comprises one input interface 16-1 ... 16-N (see FIG. 1) and one output interface 18-1 ... 18-N (see FIG. 1) and a relatively small common control processor 32-1 ... 32-N. The switch interfaces 30-1 ... 30-N are connected to the switching network 10 by means of the bi-directional lines 34-1 ... 34-N.

In this architecture, the switch interfaces 30 can use any of their idle outgoing packet slots to send messages to and receive messages from the control processor 20. Alternatively, a special packet time-slot can be dedicated as a control channel for setting up and tearing down particular connections. During this dedicated packet time-slot any switch interface can send a message to or receive a message from any other switch interface or the control processor 20. The dedicated time-slot may be used so that control packets do not interfere with data packets.

One potential application of the dedicated packet time-slot is to distribute some of the call set up functions from the central control processor 20 to the relatively small control processors 32-1 ... 32-N located in each of the switch interfaces. FIG. 5 illustrates one approach to setting up a connection between the input interface 16-1 of switch interface 30-1 and the output interface 18-N of switch interface 30-N. The connection is established using the following steps (identified by corresponding numbers in FIG. 5):

1. Control processor 20 identifies a connection to be established between the input interface 16-1 of switch interface 30-1 and the output interface 18-N of switch interface 30-N and sends a message to the local control processor 32-1 in switch interface 30-1.
2. Switch interface 30-1 communicates through the switching network 10 with switch interface 30-N about available slots.
3. Switch interface 30-N acknowledges switch interface 30-1 with a common slot to set up a connection between the input interface 16-1 of switch interface 30-1 and the output interface 18-N of switch interface 30-N.
4. Switch interfaces 30-1 and 30-N acknowledge the connection to the control processor 20. The result of this process is to establish a connection between the switch interfaces 30-1 and 30-N by means of the switching network 10.

Figure 6:
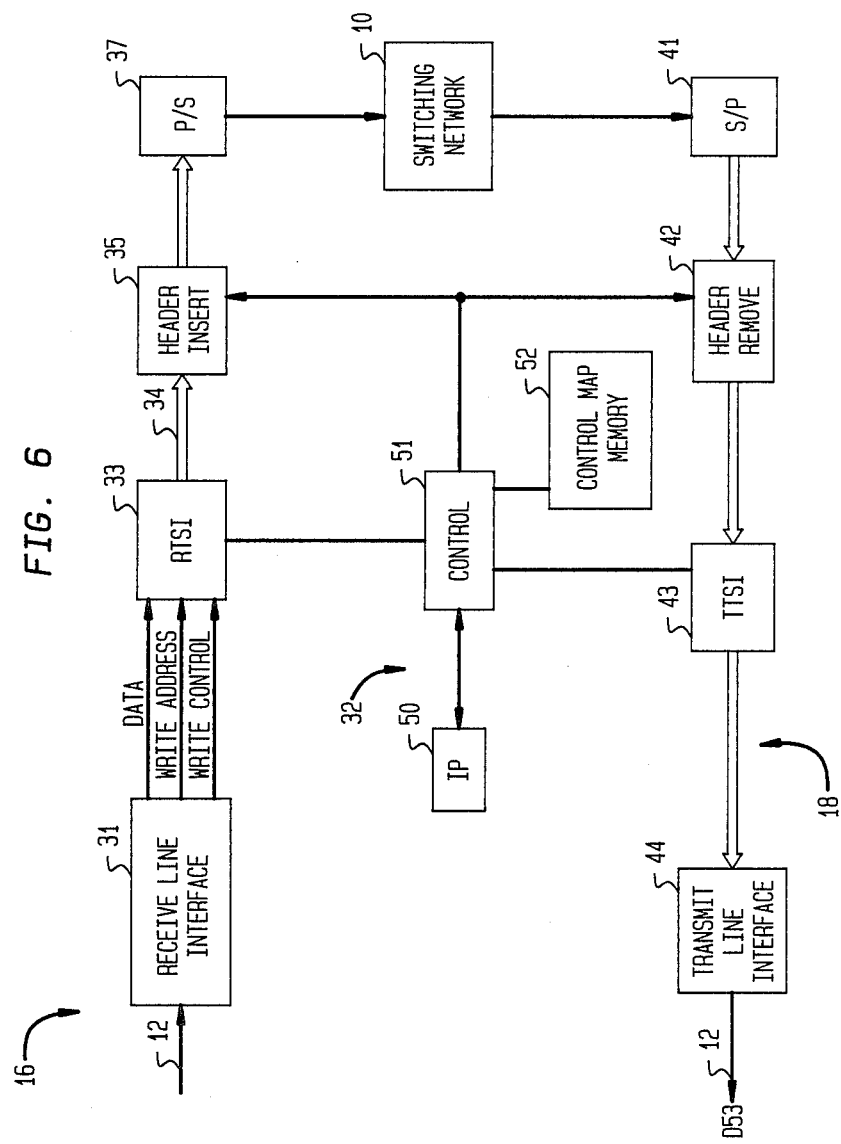
FIG. 6 schematically illustrates an input and output interface for use in connection with the switch of FIG. 5.

Turning to FIG. 6, one of the switch interfaces 30 of FIG. 5 is shown in greater detail. The switch interface 30 of FIG. 6 comprises an input interface portion 16, an output interface portion 18 and a common control section 32.

Illustratively, an input signal such as a DS3 signal enters the input interface 16 from input line 12 by way of the Receiver Line Interface 31. The Receiver Line Interface 31 terminates the serial incoming signal and converts it into a bus format comprising data, write address and write control signals. The output of the Receiver Line Interface 31 is connected to the Receiver Time-slot Interchanger (RTSI) 33. The Receiver Time-slot Interchanger 33 stores each of the incoming slots comprising the input signal in order of receiving them. Illustratively, the Receiver Time-slot Interchanger 33 has enough memory to store up to four icoming DS3 frames. The Receiver Time-slot Interchanger reads out the slots from its memory in an order determined by connection set up information. The slots are read out into the packet time-slots available at the output of the Receiver Time-slot Interchanger 33. As indicated above, if there are j time-slots per frame period entering the Time-slot Interchanger 33, then there are at least $2j-1$ packet time-slots leaving the Receiving Time-slot Interchanger 33. This insures that there is a common idle time-slot for any particular input interface, output interface pair. Illustratively, the Time-slot Interchanger 33 outputs onto a multibit data bus 34.

The Interface Processor 50 receives setup/teardown commands and maintenance commands from the central control processor 20 (see FIG. 1 and FIG. 5). The Interface Processor 50 interprets these commands and communicates with control 51. Control 51 provides all timing and control (e.g., read and write signals) for the Receiver Time-slot Interchanger 33 and the Transmitter Time-slot Interchanger 43 to be discussed below.

The control map memory 53 stores information which is used to map the incoming j slots in each frame period into the $k \geq 2j-1$ Receiver Time-slot Interchanger. This information is updated whenever a new connection is set up.

The control map memory 52 also stores the packet headers which are attached in front of each slot read out of the Receiver Time-slot Interchanger 33. Packet headers are added or deleted from this memory when connections are set up or torn down. The header insert function is handled by a multiplexer 35 which inserts the appropriate header from the control map memory 52 in front of each slot read out of the Receiver Time-slot Interchanger 33. The newly formed packets are then converted from parallel to serial form by parallel to serial converter 37 and routed through the self-routing switching network 10.

Packets leaving the switching network 10 by way of output interface 18 are first converted from serial to parallel form by way of serial to parallel converter 41. Header remover 42 checks the arriving packets for errors and removes the packet headers therefrom to reconvert the data packets back into slot form. After the headers have been stripped the arriving slots are written into a memory in the Transmitter Time-slot Interchanger 43. The control map memory 52 stores a map which maps the k (stripped) packet time-slots entering the Transmitter Time-slot Interchanger 43 in each frame period onto the j slots leaving the Transmitter Time-slot Interchanger in each frame period. Thus, slots are read out of the transmitter Time-slot Interchanger 43 in the order determined by the control map memory 52 and are converted into serial form in the Terminal Line Interface 44 for transmission over output line 14.

Figure 7:
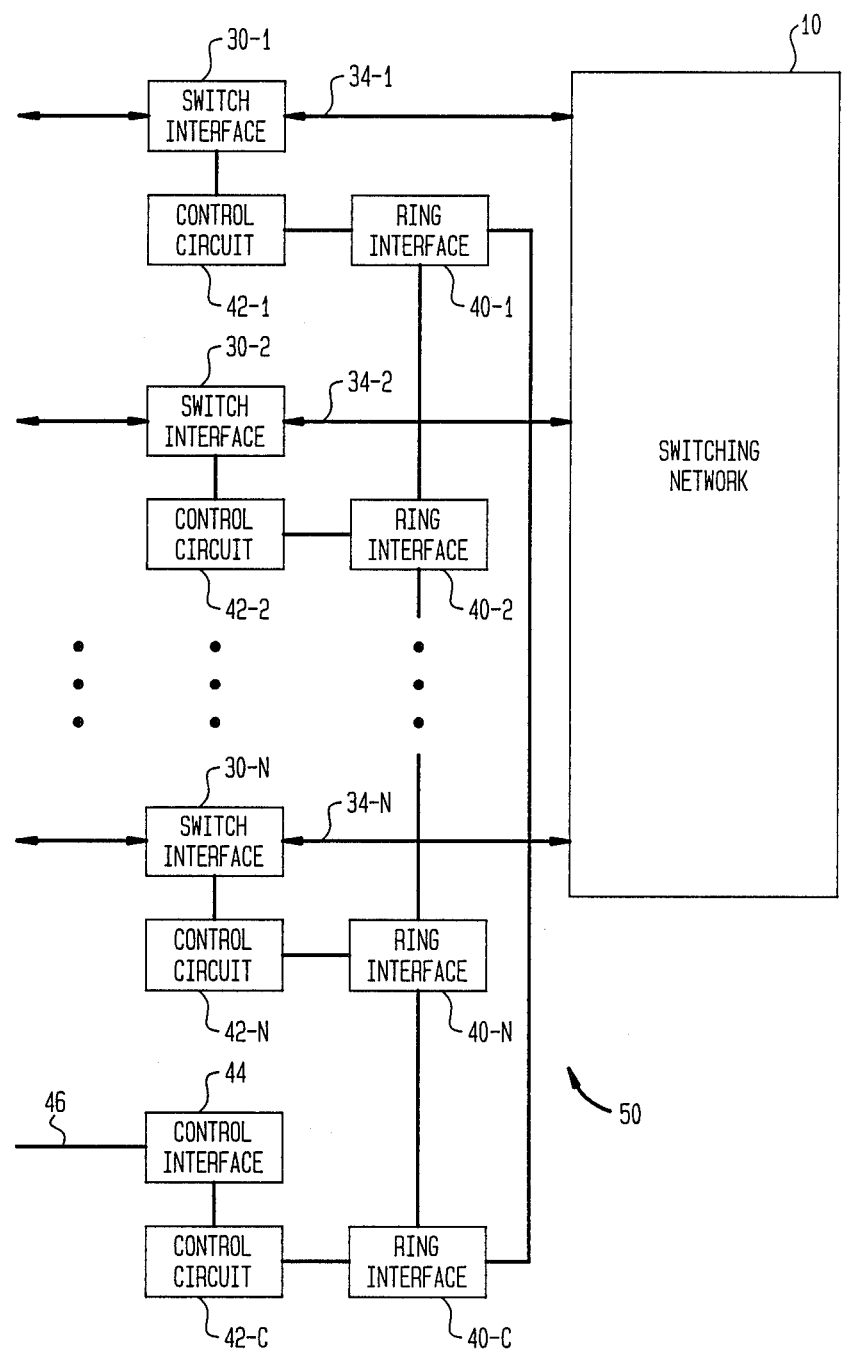
FIG. 7 schematically illustrates an alternate structure for setting up a connection in a switch similar to that shown in FIGS. 1 and 5.

In FIG. 7, an alternative embodiment of a switch is illustrated. Like the switch of FIG. 5, the switch illustrated in FIG. 7 comprises a self-routing switching network 10 which, for example, is the well-known Batcher-Banyan network. The switch of FIG. 7 also includes switch interfaces 30-1 . . . 30-N. As indicated in connection with the description of FIG. 5, the switch interfaces 30-1 . . . 30-N include input interface portions and output interface portions. The switch interfaces 30-1 . . . 30-N are connected with the self-routing switching network 10 by means of the bidirectional lines 34-1 . . . 34-N. As in the case of the switches illustrated in FIGS. 1 and 5, j external time-slots arrive per frame period at the switch interfaces 30-1 . . . 30-N and $k \geq 2j-1$ internal packet time-slots per frame period are transmitted through the switching network 10 from each switch interface.

In the switch of FIG. 5, a central control processor 20 along with a dedicated packet time-slot is utilized to set up and tear down specific connections. In contrast, in the switch of FIG. 7, a dedicated control ring 50 is used to set up and tear down connections. The use of the control ring 50 obviates the need for a central control processor.

The control ring 50 is formed from ring interfaces 40-1, 40-2 . . . 40-N, and 40-C. The ring interfaces may be viewed as forming a shift register with its tail in its mouth, each ring interface forming one stage of the shift register. The switch interfaces 30-1, 30-2 . . . 30-N communicate with their associated ring interfaces 40-1, 40-2 . . . 40-N, by means of control circuits 42-1, 42-2, . . . 42-N. Information concerning particular connections to be set up is communicated to the central control interface 44 over line 46. The control interface 44 is coupled to the control ring 50 by means of an associated ring interface 40-C and control circuit 42-C. Packets circulating around the ring 50 may be used to establish a connection between a first switch interface and a second switch interface. Switch interfaces read information from and write information into the packets by means of their associated control circuits and ring interfaces. The following procedure may be used. The control interface 44 designates a packet circulating around the ring as an active packet, for example, by writing an indication into an activity bit field contained in the packet along with an indication that the packet is to be used for connection set up. The control interface also writes an identifying address for the first switch interface and an identifying address for the second switch interfaces into the active packet along with information concerning the external time-slots which are to participate in the connection. When the active packet reaches the first switch interface, this interface recognizes its identification number in the packet and writes into the packet an idle/busy map of its internal packet time-slots. When the active packet circulates around the ring to the second switch interface, the second switch interface recognizes its identification number in the packet and compares the status of its internal packet time-slots with the status of the internal packet time-slots of the first switch interface (previously written into the circulating packet) to identify a common idle time-slot. Information concerning the common idle time-slot is then communicated back to the first switch interface in a second pass of the packet around the ring.

A packet circulating around a ring may also be used to tear down a connection. In this case, the control interface writes a connection tear down indication into a packet along with an identification of the relevant switch interfaces and time-slots.

Finally, the above-described embodiments of the invention are intended to be illustrative only. Numerous alternative embodiments may be devised by those skilled in the art without departing from the spirit and scope of the following claims.

What is claimed is:

1. A circuit switch for use in a node of a telecommunications network for switching circuit signals comprising slots organized into frames on a slot-by-slot basis, said switch comprising:
    a self-routing packet switching network having a plurality of inputs and a plurality of outputs,
    means associated with said inputs for receiving input signals comprising slots organized into frames,
    means for storing headers containing information indicating addresses of said packet switching network outputs,
    means for combining at least some of said slots with said headers to form packets capable of being routed through said self-routing network to the specific addresses indicated by said headers, and
    means associated with said outputs for receiving said packets from said network and for converting said packets routed through said network into output signals comprising slots organized into frames.

2. The switch of claim 1 wherein slots in the same frame are combined with different headers to form packets which are routed to different outputs of said network.

3. A circuit switch for switching circuit signals comprising slots organized into frames on a slot-by-slot basis, comprising
    a self-routing packet switching network having a plurality of inputs and a plurality of outputs, and
    a plurality of interfaces connected to said packet switching network, each interface including means for receiving a signal comprising frames organized into slots, means for storing headers containing information indicating addresses of the outputs of said switching network, means for combining said slots with said headers to form packets capable of being routed through said self-routing packet switching network to specific outputs thereof, and means for converting said packets back into slots after routing through said network.

4. The switch of claim 3 wherein said interfaces are interconnected to form a ring, said ring being adapted to circulate packets for setting up and tearing down connections between particular pairs of interfaces.

* * * * *